(12) United States Patent
Govindan

(10) Patent No.: US 11,249,959 B2
(45) Date of Patent: Feb. 15, 2022

(54) ECOSYSTEM-AWARE STORAGE ARRAYS FOR UNIFIED ANALYTICS USING EDGE ARCHITECTURE

(71) Applicant: EMC IP Holding Company LLC, Hopkinton, MA (US)

(72) Inventor: Balasundaram Govindan, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 401 days.

(21) Appl. No.: 16/398,394

(22) Filed: Apr. 30, 2019

(65) Prior Publication Data
US 2020/0349127 A1 Nov. 5, 2020

(51) Int. Cl.
*G06F 16/00* (2019.01)
*G06F 16/18* (2019.01)
*G06F 9/54* (2006.01)
*G06F 16/17* (2019.01)

(52) U.S. Cl.
CPC .......... *G06F 16/1873* (2019.01); *G06F 9/541* (2013.01); *G06F 16/1734* (2019.01)

(58) Field of Classification Search
CPC .. G06F 16/1873; G06F 9/541; G06F 16/1734; G06F 16/2465; H04L 67/2819; H04L 67/10
See application file for complete search history.

(56) References Cited

U.S. PATENT DOCUMENTS

| | | | | |
|---|---|---|---|---|
| 6,922,724 | B1 * | 7/2005 | Freeman | G06F 9/505 709/223 |
| 2004/0024688 | A1 * | 2/2004 | Bi | G06Q 40/04 705/37 |
| 2016/0353457 | A1 * | 12/2016 | Park | H04B 7/024 |
| 2020/0184035 | A1 * | 6/2020 | Santelia | H04L 63/10 |
| 2020/0296177 | A1 * | 9/2020 | Hammer | G06Q 30/0202 |

\* cited by examiner

*Primary Examiner* — Ajith Jacob
(74) *Attorney, Agent, or Firm* — Amin, Turocy & Watson, LLP

(57) ABSTRACT

Described herein are systems, methods, and machine-readable storage mediums relating ecosystem-aware storage arrays for unified analytics using edge architecture. According to an embodiment, a system can comprise a processor and a memory that stores executable instructions that, when executed by the processor, facilitate performance of operations. The operations can comprise receiving data associated with one or more edge devices. The operations can further comprise, based on validation of the data associated with the one or more edge devices comprising performing edge analytics, generating a first level analytics report. The operations can further comprise, based on the first level analytics report, determining a sufficient amount of the data according to a sufficiency criterion that defines the sufficient amount of the data that is to be usable by a secure remote service to generate a second level analytics report based on a core analytics analysis of the sufficient amount of the data. The operations can further comprise transmitting the sufficient amount of the data to a secure remote service.

20 Claims, 10 Drawing Sheets

ECOSYSTEM-AWARE STORAGE ARRAYS FOR UNIFIED ANALYTICS USING EDGE ARCHITECTURE

TECHNICAL FIELD

The subject disclosure relates generally to edge computing, and more particularly, to ecosystem-aware storage arrays for unified analytics using edge architecture.

BACKGROUND

Edge computing can enable data processing and analytics to be processed closer to the source (e.g., edge devices, ecosystem products, data center products, etc.) of the data in an enterprise system. However, traditionally, ecosystem products need to be registered with a secure remote service in order for the ecosystem products to transfer bulk data to the secure remote service for troubleshooting. Bulk data transfers can use maximum network bandwidth and increase the cost of enterprise businesses. Unnecessarily, the ecosystem products send all of its data from the customer data center (e.g., customer's environment) to the secure remote service in the server's environment, which can cause security risks as the data is being transmitted to an external source. For a single secure remote service to process all of the data from the ecosystem products, the secure remote service can become overloaded and slow down analytics.

Additionally, if a customer refuses to register the ecosystem products with the secure remote service, the secure remote service will not be able to troubleshoot by tracking the license information or version information of the ecosystem products for expired or outdated information. Consequently, business enterprises are not able to identify violated licenses and sell licenses of the product. Likewise, if the ecosystem products are not registered with the secure remote service, the secure remote service will not be able to track the version information and notify the customer of new releases.

Implementation of ecosystem-aware storage arrays for unified analytics using edge architecture would help minimize network bandwidth, minimize security risk, and perform analytics in an in-house environment. By registering the secure remote service in the storage array, and not in the ecosystem products, access to the ecosystem products from external systems could be prevented.

SUMMARY

The following presents a simplified summary of the disclosed subject matter to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an embodiment, a system is provided. The system can comprise a processor and a memory that stores executable instructions that, when executed by the processor, facilitate performance of operations. The operations can comprise receiving data associated with one or more edge devices. The operations can further comprise, based on validation of the data associated with the one or more edge devices comprising performing edge analytics, generating a first level analytics report. The operations can further comprise, based on the first level analytics report, determining a sufficient amount of the data according to a sufficiency criterion that defines the sufficient amount of the data that is to be usable by a secure remote service to generate a second level analytics report based on a core analytics analysis of the sufficient amount of the data. The operations can further comprise transmitting the sufficient amount of the data to a secure remote service.

In another embodiment, a method is provided. The method can comprise receiving, by a system comprising a processor and a memory, data associated with a group of edge devices. The method can further comprise, based on validation of the data associated with the group of edge devices comprising performing edge analytics, generating, by the system, a first level analytics report. The method can further comprise, based on the first level analytics report, determining, by the system, a sufficient amount of the data according to a sufficiency criterion that defines the sufficient amount of the data that is to be usable by a secure remote service to generate a second level analytics report based on a core analytics analysis of the sufficient amount of the data. The method can further comprise transmitting, by the system, the sufficient amount of the data to a secure remote service.

In another embodiment, a machine-readable storage medium is provided. The machine-readable storage medium can comprise executable instructions that, when executed by a processor, facilitate performance of operations. The operations can comprise receiving data associated with an edge device. The operations can further comprise, based on validation of the data associated with the edge device comprising performing edge analytics, generating a first level analytics report. The operations can further comprise, based on the first level analytics report, determining a sufficient amount of the data according to a sufficiency criterion that defines the sufficient amount of the data that is to be usable by a secure remote service to generate a second level analytics report based on a core analytics analysis of the sufficient amount of the data. The operations can further comprise transmitting the sufficient amount of the data to a secure remote service.

The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It can also be appreciated that the detailed description can include additional or alternative embodiments beyond those described in this summary.

BRIEF DESCRIPTION OF DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
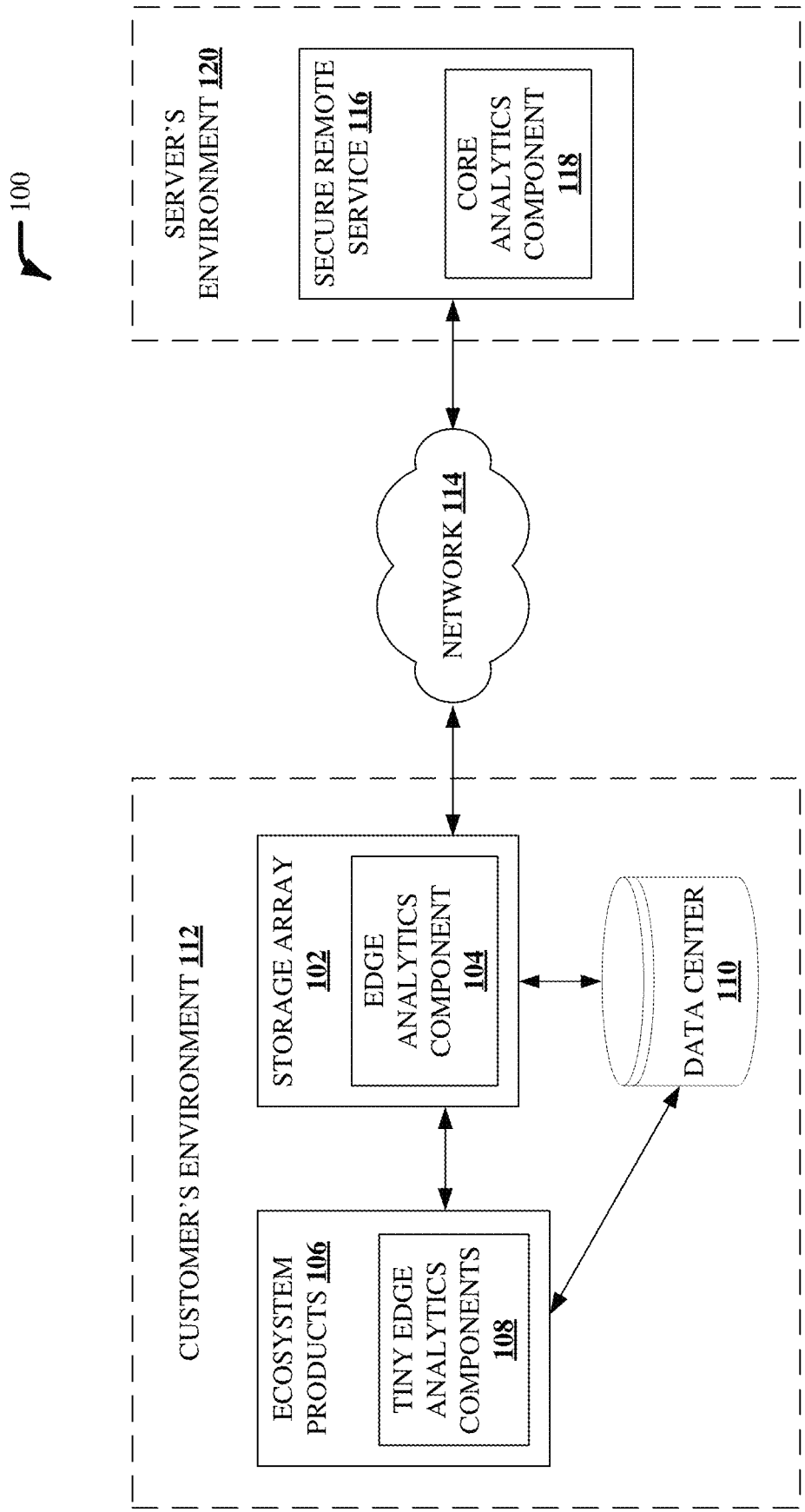
FIG. 1 illustrates a block diagram of an example, non-limiting system comprising an ecosystem-aware storage array for unified analytics using edge architecture in accordance with one or more embodiments described herein.

The following detailed description is merely illustrative and is not intended to limit embodiments and/or applications or uses of embodiments. Furthermore, there is no intention to be bound by any expressed or implied information presented in the preceding Summary section, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident however, in various cases, that one or more embodiments can be practiced without these specific details.

In enterprise systems, a storage array can be deployed with ecosystem products (e.g., data center products, edge devices, etc.) such as backup products, replication products, recovery products, and virtualization products. Data from ecosystem products can be critical in enterprise businesses for analytics to validate license information and version information of the ecosystem products and send notification for new releases. Codes can be employed to integrate and register the ecosystem products with a secure remote service to collect data for analytics. Due to security concern, customers are not willing to register the ecosystem products to the secure remote service. Therefore, storage array vendors are not able to perform analytics based on data from the ecosystem products. Analytics can help deduct issues earlier and understand the customer's environment.

However, bulk data transfers from the ecosystem products to the secure remote service maximize network bandwidth usage. Bulk data transfers can also be insecure. Furthermore, the use of a single analytics engine to process all the data in the secure remote service is not suitable for scalable or real time analytics. Moreover, if customers are not willing to register the ecosystem products to the secure remote service, analytics can be lost.

One or more embodiments described herein can facilitate unified analytics using edge architecture and ecosystem-aware storage arrays (e.g., generally, storage arrays). Edge architecture can recommend pushing intelligence and processing capabilities to the ecosystem products. The ecosystem products can determine what data should be sent to a secure remote service for analysis. This proposed solution can reduce the network bandwidth usage by transmitting only required data (e.g., a sufficient amount of data) and avoid bulk data transfers to the secure remote service. However, transferring data to the secure remote service and outside of the data center (e.g., customer's data center, customer's environment, etc.) can involve security risks. To avoid these security risks, a storage array can be integrated with the ecosystem products. The storage array can collect data from the ecosystem products and execute an initial analysis to generate a first level analytics report on the data. If required, based on the first level analytics report the storage array can determine a sufficient amount of the data to send to the secure remote service to execute further analysis and generate a second level analytics report.

FIG. 1 illustrates a block diagram of an example, non-limiting system 100 comprising an ecosystem-aware storage array 102 (e.g., generally, storage array 102) for unified analytics using edge architecture in accordance with one or more embodiments described herein. The system 100 can comprise the storage array 102, ecosystem products 106 (e.g., edge devices), and a data center 106 located in a customer's environment 112, wherein the storage array 102 can communicate, via a network 114, with a secure remote service 116 located in a server's environment 120. The storage array 102 can receive data associated with the ecosystem products 106. The ecosystem products 106 can have intelligence such as tiny edge analytics components 108 to determine which data is needed by the storage array 102 for analysis. Additionally, the storage array 102 can also transmit requests for data to the ecosystem products 106. The data center 110 can be connected to the storage array 102 and the ecosystem products 106 for storing the data.

The storage array 102 can be an analytics machine comprising an edge analytics component 104 to perform a first level analytics on the data associated with the ecosystem products 106. The ecosystem products 106 can be registered to the storage array 102 using a display component (e.g., display component 310 as described below) of the storage array 102. The credential of the ecosystem products 106 can be registered in the storage array 102. For example, the ecosystem products 106 can introduce analytics role in their access control upon registering to storage array 102. More specifically, the ecosystem products 106 can be registered to the storage array 102 with different access controls. For example, the ecosystem products 106 can be registered with different roles such as an administrator, an application user, etc. The different roles can provide different functionalities in the ecosystem products 106. For example, an administer can access all functionalities. Whereas, an application user can access a limited number of functionalities. The storage array 102 can access the functionalities associated with the roles registered by ecosystem products 106 via application programming interfaces (APIs). The API can comprise the function of request for report to obtain requested name information of the ecosystem products 106. The API can further comprise the function request for logs to obtain requested log information of the ecosystem products 106. The API can further comprise the function request for license to obtain license information of the ecosystem products 106. The API can further comprise the function request for version to obtain version information of the ecosystem products 106.

The storage array 102 can comprise the edge analytics component 104 that can perform edge analytics to validate the data associated with the ecosystem products 106. Based on the analysis by the edge analytics component 104, the storage array 102 can generate a first level analytics report. Validation of the data can comprise validating whether the license information or the version information of the ecosystem products 106 are up-to-date. If the license information or the version information are outdated, the storage array 102 can notify that the license information is outdated license information and is to be updated or the version information is outdated version information and is to be updated. A request to update can also be included in the notification. The notifying can comprise sending the outdated license information or the outdated version information via a unified notification (e.g., generally, notification) as a single report for a group of the ecosystem products 106 comprising the outdated license information or the outdated version information. It can be appreciated that the notification can also be made separately for individual ecosystem products 106. The storage array 102 can render the unified notification using a display component (e.g., display component 310 as described below). If the updates are not completed and the license information or the version information remain outdated, the storage array 102 can transmit a sufficient amount of the data via the network 114 to the secure remote service 116 for further analysis.

Based on the first level analytics report, the storage array 102 can determine a sufficient amount of the data according to a sufficiency criterion that defines the sufficient amount of the data that is to be usable by a secure remote service 116 to generate a second level analytics report based on a core analytics analysis of the sufficient amount of the data. The storage array 102 can transmit the sufficient amount of the data to the secure remote service 116. It can be appreciated that the storage array 102 can erase the first level analytics report upon sending a sufficient amount of the data to the secure remote service 116.

By transmitting a sufficient amount of the data to the secure remote service 116 via the network 114, the secure remote service 116 is not receiving a bulk data transfer and the network 114 is not transmitting a bulk data transfer. Thus, the data flow and the bandwidth usage can be reduced. In addition, security can improve because the data transfer is from the storage array 102 rather than from a number of individual ecosystem products 106 to the secure remote service 116 in the server's environment 120, an external environment.

In some embodiments, it can be appreciated that the secure remote service 116 can transmit requests to the storage array 102 for additional data associated with the ecosystem products 106. For example, the secure remote service 116 can transmit a request to the storage array 102 for usage information associated with the ecosystem products 106. The secure remote service 116 can comprise a core analytics component 118 that can perform core analytics analysis on the sufficient amount of the data. The core analytics analysis on the sufficient amount of the data can comprise at least one of analyzing, based on a result received from the secure remote service 116 or determined by the storage array 102: usage information relative to a defined usage, whether the license information is up-to-date, whether the version information is up-to-date, or the log information of the ecosystem products 106. If the license information or the version information are outdated, the secure remote service 116 can transmit the core analytics analysis to the storage array 102 for notification that the license information is outdated license information and is to be updated or the version information is outdated version information and is to be updated. The notification can comprise sending the outdated license information or the outdated version information via a unified notification as a single report for a group of the ecosystem products 106 comprising the outdated license information or the outdated version information. It can be appreciated that the notification can also be made separately for individual ecosystem products 106 and that reminders to update can be attached in the notification. The notification can be rendered using a display component (e.g., display component 310 as described below) of the storage array 102.

Figure 2:
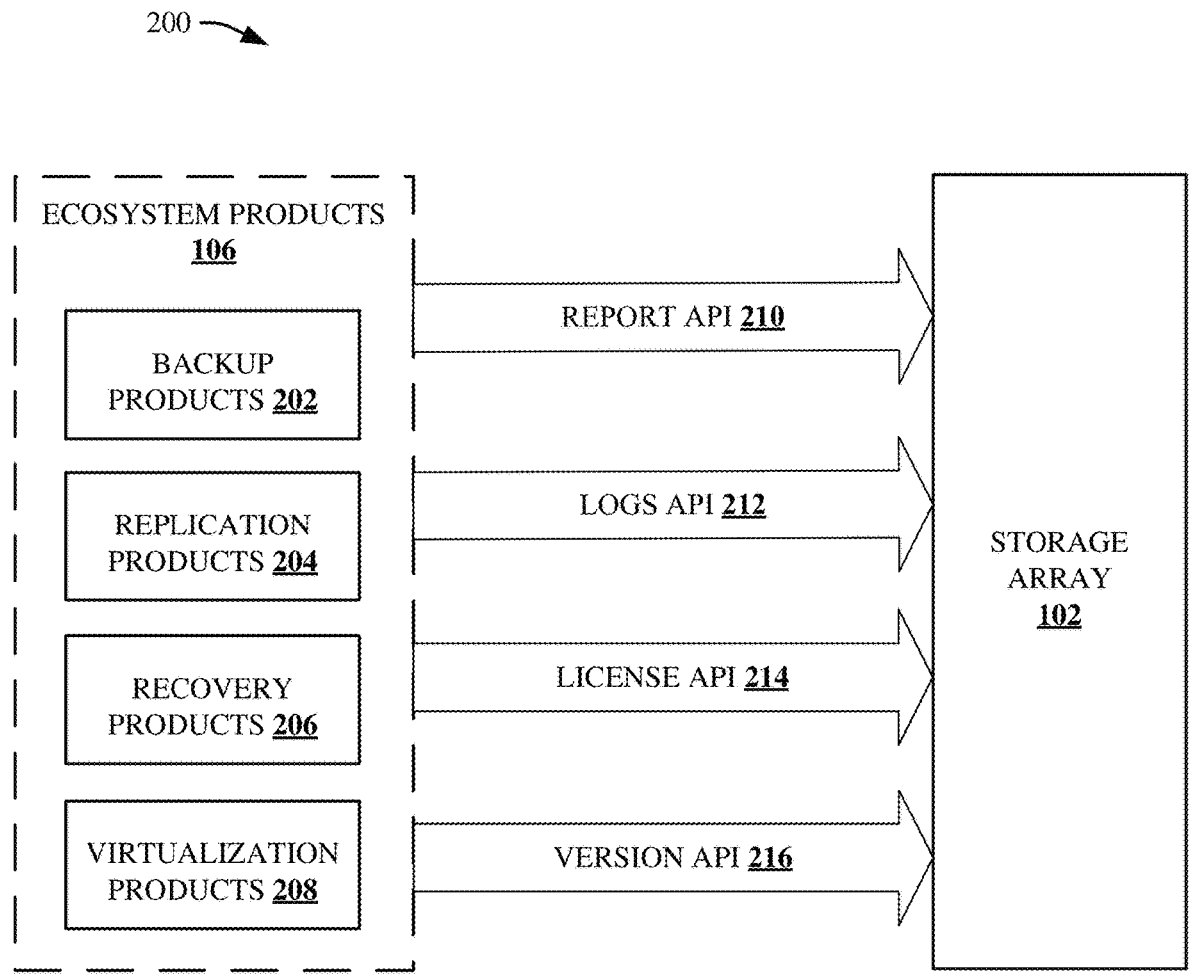
FIG. 2 illustrates a block diagram of an example, non-limiting system facilitating unified analytics using edge architecture in accordance with one or more embodiments described herein.

FIG. 2 illustrates a block diagram of an example, non-limiting system 200 facilitating unified analytics using edge architecture in accordance with one or more embodiments described herein. The storage array 102 can be deployed with the ecosystem products 106 such as backup products 202, replication products 204, recovery products 206, or virtualization products 208. The backup products 202 can perform data backups. The replication products 204 can perform data replication. The recovery products 204 can recover data. The virtualization products 208 can create simulated, virtual environments for deploying computer programs.

The system 200 can comprise APIs that can expose functionalities of the ecosystem products 106 to the storage array. In exemplary embodiments, the system 200 can comprise four APIs such as report API 210, logs API 212, license API 214, and version API 216. The report API 210 can expose requested name information. For example, if the requested name information is for registered systems, the report API 210 can expose how many systems are registered with the ecosystem products 106. If the requested name information is for user information, the report API 210 can expose how many users are in the ecosystem products 106. If the requested name information is for usage information, the report API 210 can generate a usage report. If the requested name information is for storage information, the report API 210 can generate a storage information report.

The logs API 212 can expose log information of the ecosystem products 106 to the storage array 102. Every time a customer uses the ecosystem products 106, the use can be logged with a start time and end time. The logs API 212 can come with additional parameters as filters such as start date and end date. For example, if the requested logs are for 2 days or 1 months, the logs API 212 can generate a log for those specified time periods. The license API 214 can expose license information of the ecosystem products 106 to the storage array 102. The ecosystem products 106 can have different types of licenses for controlled usage of the ecosystem products 106. For example, a trial license can provide limited access for the duration of a shorten trial period. An unlimited license can provide access to all the features without restrictions for the duration of the license. The version API 216 can expose version information of the ecosystem products 106 to the storage array 102. The version information from the ecosystem products 106 can be used to analyze and determine how many customers are using certain versions of the ecosystem products 106.

The ecosystem products can also expose functionalities via the APIs for analyzing and troubleshooting. For example, the edge analytics component 104 or the core analytics component 118 can analyze that the license information or the version information are outdated. The storage array 102 can render a notification that the license information or the version information need to be updated.

Figure 3:
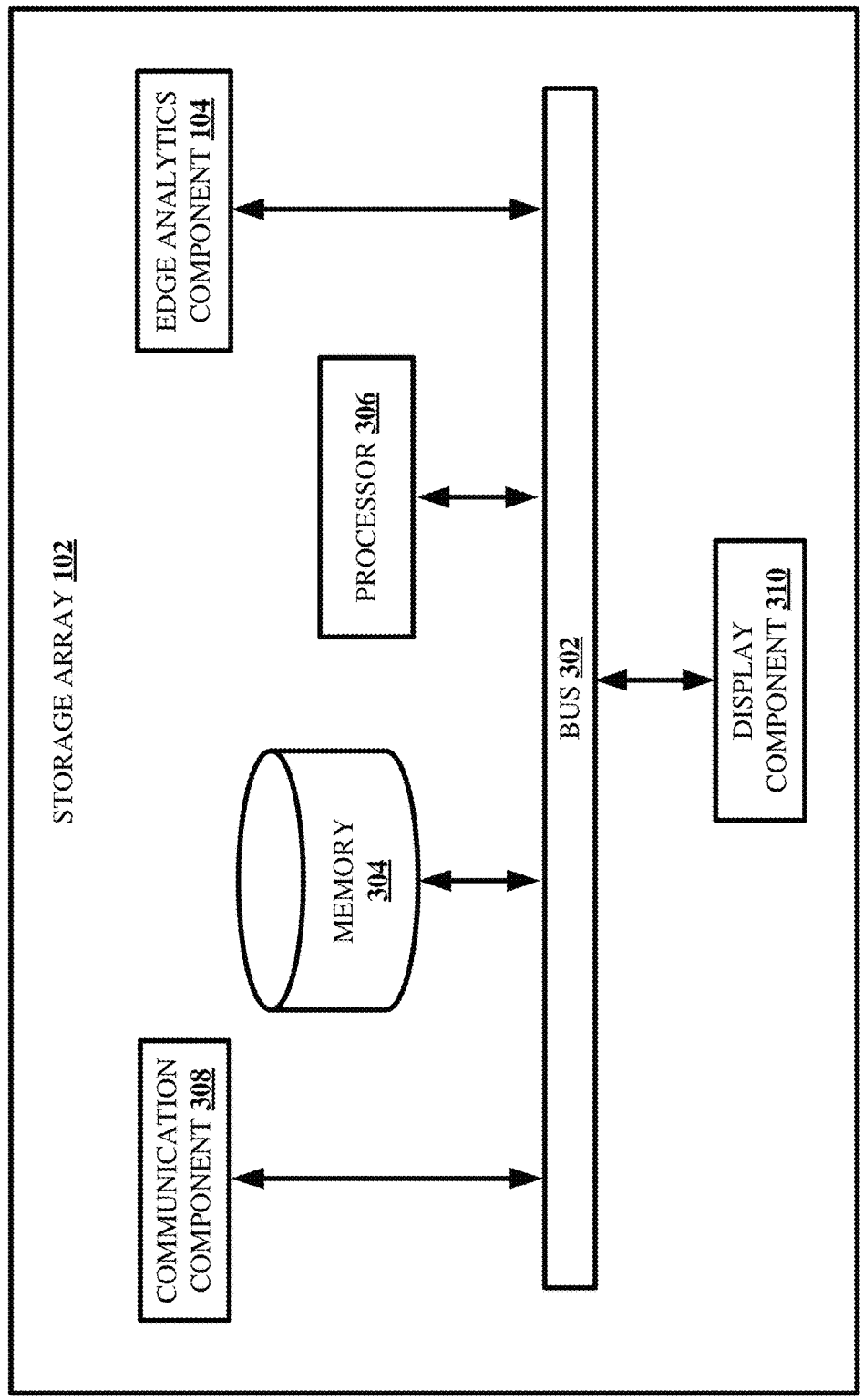
FIG. 3 illustrates a block diagram of an example, non-limiting system 300 comprising the storage array facilitating unified analytics using edge architecture in accordance with one or more embodiments described herein.

FIG. 3 illustrates a block diagram of an example, non-limiting system 300 comprising the storage array 102 facilitating unified analytics using edge architecture in accordance with one or more embodiments described herein. The storage array 102 can comprise a bus 302, memory 304, processor 306, communication component 308, edge analytics component 104, and/or display component 310. The bus 302 can provide for interconnection of various components of the storage array 102. The memory 304 and processor 306 can carry out computation and/or storage operations of the storage array 102 as described herein. It can be appreciated that in some embodiments one or more system components can communicate wirelessly with other components, through a direct wired connection or integrated on a chipset.

In some embodiments, the communication component 308 can be used to transmit and receive data. The communication component 308 can receive data associated with the ecosystem products 106. The communication component 308 can transmit data to the secure remote service 116. The communication component 308 can also transmit requests for data to the ecosystem products 106. The request for data or functionalities of the ecosystem products 106 can be accessible via the APIs. For example, the report API 210 can expose requested name information of the ecosystem products 106. The logs API 212 can expose requested log information of the ecosystem products 106. The license API 214 can expose license information of the ecosystem products 106. The version API 216 can expose version information of the ecosystem products 106.

The edge analytics component 104 can perform edge analytics to validate the data associated with the ecosystem products 106. The validation of the data associated with the ecosystem products 106 can comprise validating whether the license information or the version information of the ecosystem products 106 are up-to-date. Based on validation of the data associated with the ecosystem products 106 comprising performing edge analytics, the storage array 102 via the edge analytics component 104 can generate a first level analytics report. Based on the first level analytics report, the storage array 102 via the edge analytics component 104 can determine a sufficient amount of the data according to a sufficiency criterion that defines the sufficient amount of the data that is to be usable by the secure remote service 116 to generate a second level analytics report based on a core analytics analysis of the sufficient amount of the data. The storage array 102 can transmit, via the communication component 308, the sufficient amount of the data to the secure remote service 112 to perform a core analytics analysis by the core analytics component 118. As necessary, the secure remote service 116 can also transmit requests to the storage array 102 for additional data associated with the ecosystem products 106. The storage array 102 can receive, via the communication component 308, the requests from the secure remote service 116 transmitted via the network 114.

The storage array 102 can notify the user that the license information is outdated license information and is to be updated or the version information is outdated version information and is to be updated. The notifying can comprise sending the outdated license information or the outdated version information via a unified notification as a single report for a group of the ecosystem products 106 comprising the outdated license information or the outdated version information. It can be appreciated that the notification can also be made for individual ecosystem products 106. The storage array 102 can render the unified notification, or notifications generally, using the display component 310. The display component 310 can also be used to register the ecosystem products 106 with the storage array 102. By registering the ecosystem products 106 with the storage array 102, the storage array 102 receive access to functionalities of the ecosystem products 106 for analyzing and troubleshooting.

Figure 4:
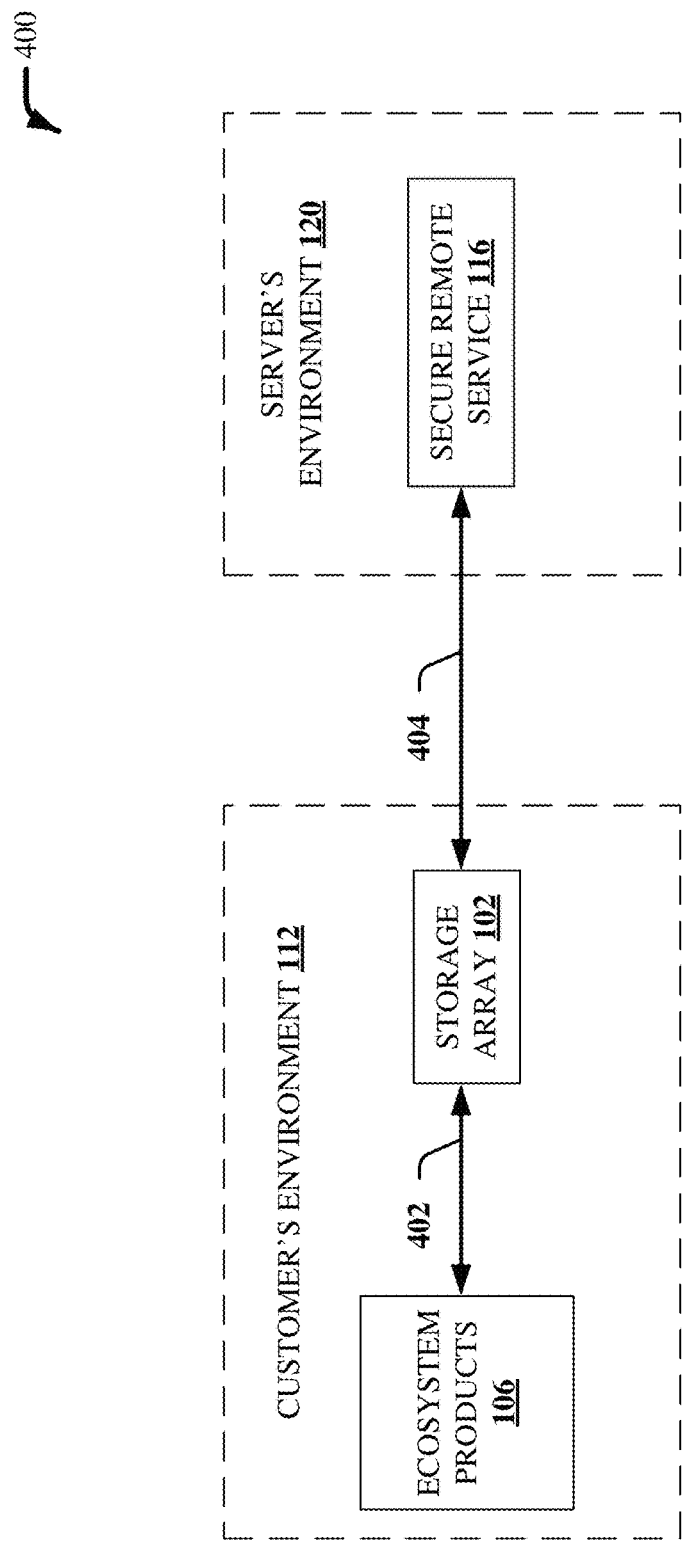
FIG. 4 illustrates a block diagram of an example, non-limiting system facilitating unified analytics using edge architecture in accordance with one or more embodiments described herein.

FIG. 4 illustrates a block diagram of an example, non-limiting system 400 facilitating unified analytics using edge architecture in accordance with one or more embodiments described herein. The storage array 102 can be the point of contact between the ecosystem products 106 and the secure remote service 116. Via the communication component 308, the storage array 102 can have a two-way communication line 402 for transmitting and receiving data between the ecosystem products 106. Similarly, via the communication component 308, the storage array 102 can have a two-way communication line 404 for transmitting and receiving data between the secure remote service 116. The ecosystem products 106 can be registered with the storage array 102 to allow communication between the ecosystem products 106 and the storage array 102. The storage array 102 can be registered with the secure remote service 116 by default to facilitate communication between the ecosystem products 106 and the secure remote service 116.

For example, the storage array 102 can validate the license information or the version information of the ecosystem products 106 and render a unified notification on a single report of all the ecosystem products 106. The storage array 102 can generate a first level analytics report and send a sufficient amount of the data to the secure remote service 116 for further analytics. If necessary, the secure remote service 116 can transmit requests to the storage array 102 for additional data associated with the ecosystem products 106.

Upon registration of the ecosystem products 106 with the storage array 102, the storage array 102 can validate the version information to determine whether the ecosystem products 106 are supported with the storage array 102. For example, the storage array 102 can maintain and validate the version information associated with the ecosystem products 106 using a support matrix configuration. A support matrix configuration can provide information as to which ecosystem products 106 are supported by which storage array 102. Via the display component 310, the storage array 102 can render a notification that certain ecosystem products 106 are not compatible with the storage array 102 and need to be updated.

The ecosystem products 106 can be registered to the storage array 102 for troubleshooting by collecting data from the ecosystem products 106 and performing edge analytics on the data. The storage array 102 can be registered with the secure remote service 116 by default for further analysis, on the data associated with the ecosystem products 106, by the core analytics component 118. By registering the storage array 102 with the secure remote service 116 for core analytics analysis, the storage array 102 can be a single point of access for the secure remote service 116, an external source in the server's environment 120, to collect data associated with the ecosystem products 106 in the customer's environment 112. Thus, multiple access points can be avoided because there are no longer multiple ecosystem products 106 registered to the secure remote service 116, and thereby, security risks can be minimized. More specifically, to communicate with the secure remote service 116, a bulk code can be used to establish communication. Having a bulk code in the storage array 102 to communicate with the secure remote service 112 can avoid having the bulk codes in all of the ecosystem products 106.

Figure 5:
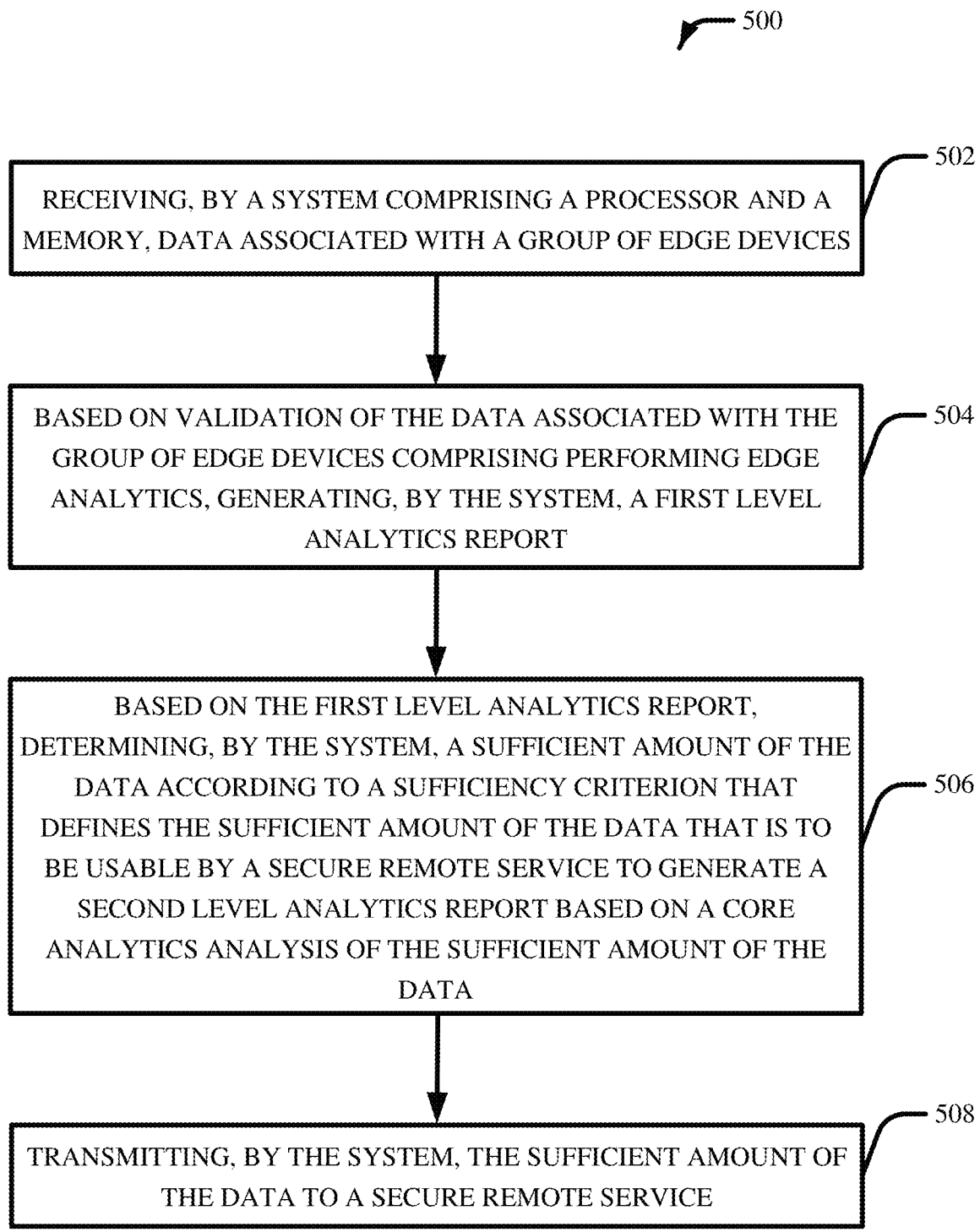
FIG. 5-8 illustrate flow diagrams of example, non-limiting methods facilitating unified analytics using edge architecture in accordance with one or more embodiments described herein.

FIG. 5 illustrates a flow diagram of an example, non-limiting method 500 facilitating unified analytics using edge architecture in accordance with one or more embodiments described herein. At 502, the method 500 can comprise receiving (e.g., via the communication component 308), by a system comprising a processor and a memory, data associated with a group of edge devices. At 504, the method 500 can comprise, based on validation of the data associated with the group of edge devices comprising performing edge analytics, generating (e.g., via the edge analytics component 104), by the system, a first level analytics report. At 506, the method 500 can comprise, based on the first level analytics report, determining (e.g., via the edge analytics component 104), by the system, a sufficient amount of the data according to a sufficiency criterion that defines the sufficient amount of the data that is to be usable by a secure remote service to generate a second level analytics report based on a core analytics analysis of the sufficient amount of the data. At 508, the method 500 can comprise transmitting (e.g., via the communication component 308), by the system, the sufficient amount of the data to a secure remote service.

Figure 6:
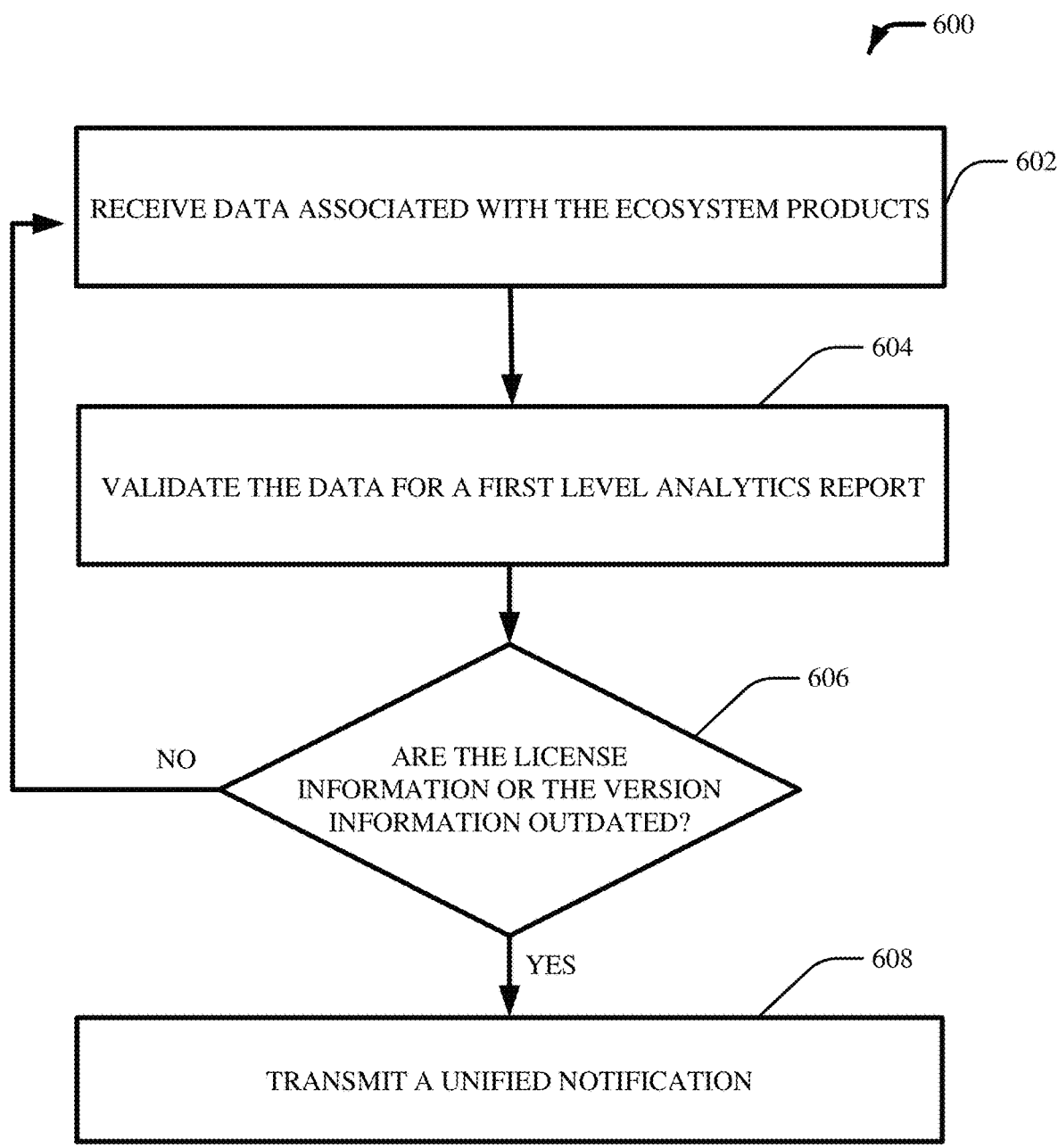

FIG. 6 illustrates a flow diagram of an example, non-limiting method 600 facilitating unified analytics using edge architecture in accordance with one or more embodiments described herein. At 602, the method 600 can comprise receiving (e.g., via the communication component 308) data associated with the ecosystem products 106. At 604, the method 600 can comprise validating (e.g., via the edge analytics component 104) the data for a first level analytics report. At 606, the method 600 can comprise determining (e.g., via the edge analytics component 104) whether the license information or the version information are outdated. If no, continue at 602. If yes, proceed to 608. At 608, the method 600 can comprise transmitting (e.g., via the display component 310) a unified notification.

Figure 7:
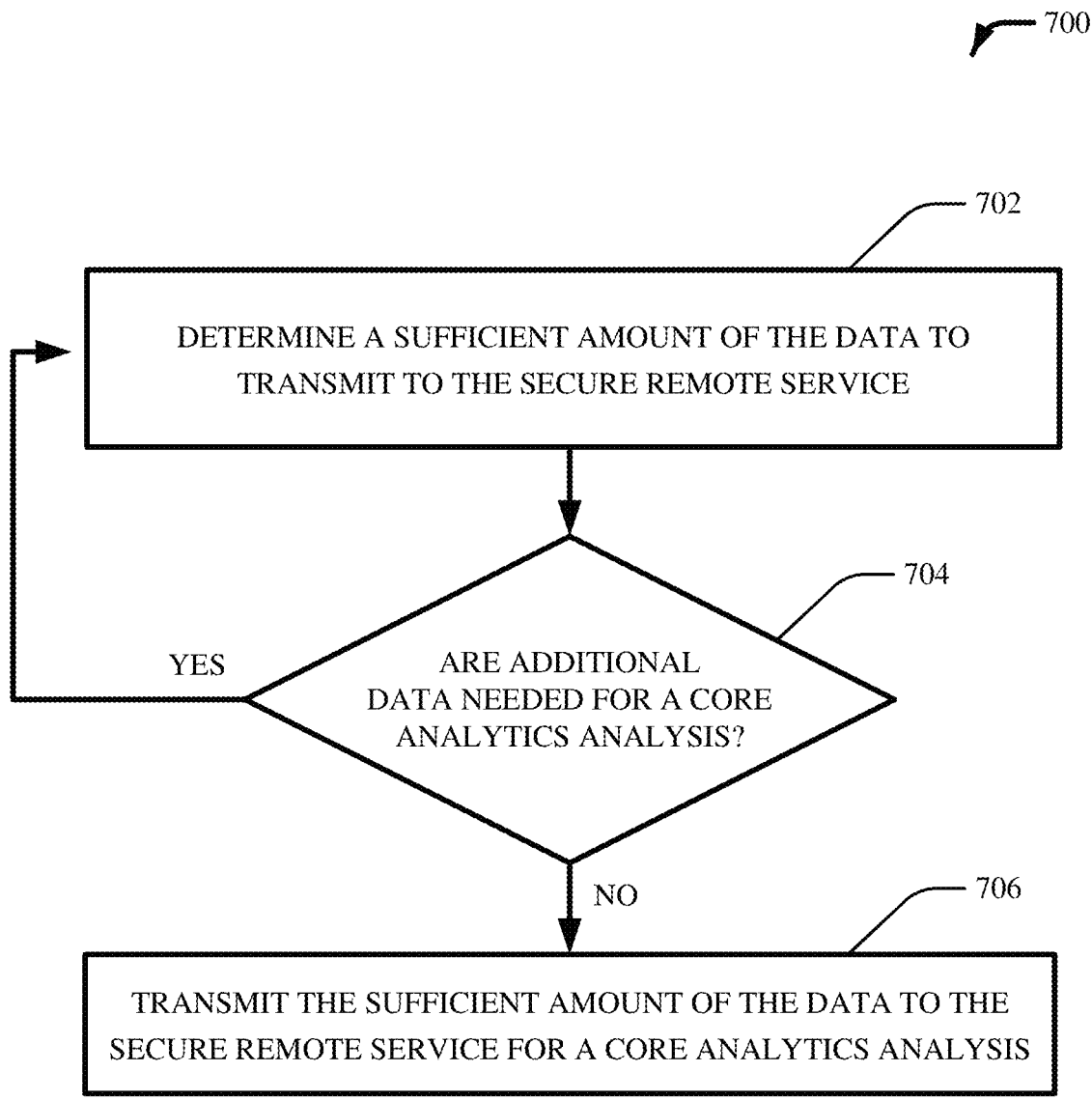

FIG. 7 illustrates a flow diagram of an example, non-limiting method 700 facilitating unified analytics using edge architecture in accordance with one or more embodiments described herein. At 702, the method 700 can comprise determining (e.g., via the edge analytics component 104) a sufficient amount of the data to transmit to the secure remote service 116. At 704, the method 700 can comprise determining (e.g., via the edge analytics component 104) whether additional data associated with the ecosystem products 106 are needed for a core analytics analysis. If yes, continue at 702. If no, proceed to 706. At 706, the method 700 can comprise transmitting the sufficient amount of the data to the secure remote service 116 for a core analytics analysis.

Figure 8:
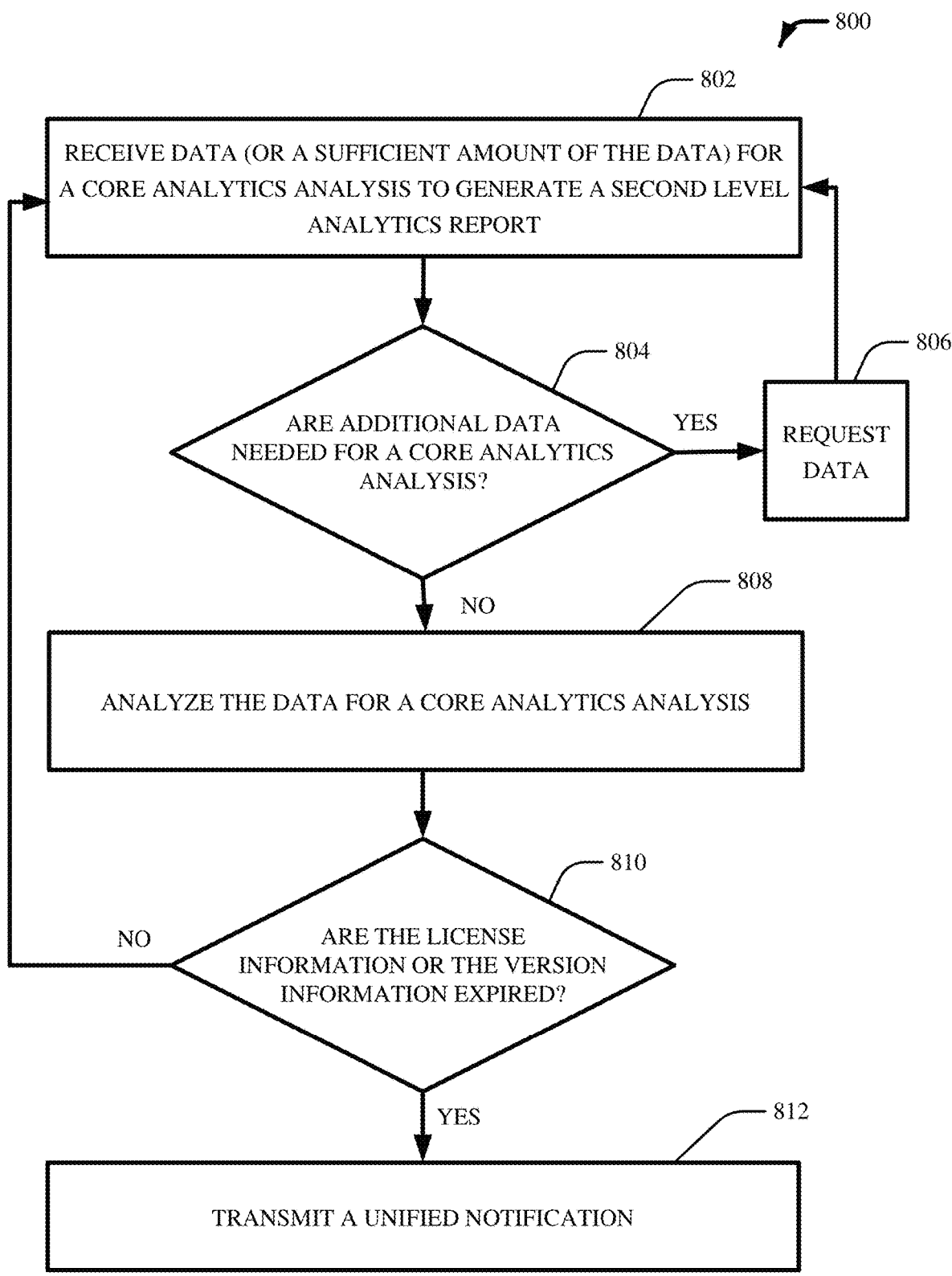

FIG. 8 illustrates a flow diagram of an example, non-limiting method 800 facilitating unified analytics using edge architecture in accordance with one or more embodiments described herein. At 802, the method 800 can comprise receiving (e.g., by the secure remote service 116) data (or a sufficient amount of the data) for a core analytics analysis to generate a second level analytics report. At 804, the method 800 can comprise determining (e.g., via the core analytics component 118) whether additional data are needed for a core analytics analysis. If yes, at 806, the method 800 can comprise requesting (e.g., by the secure remote service 116) the storage array 102 for additional data associated with the ecosystem products 106. If no, at 808, the method 800 can comprise analyzing (e.g., by the secure remote service 116) the data for a core analytics analysis. At 810, the method 800 can comprise determining whether the license information or the version information are outdated. If no, continue at 802. If yes, proceed to 812. At 812, the method 800 can comprise transmitting (e.g., via the display component 310) a unified notification.

Figure 9:
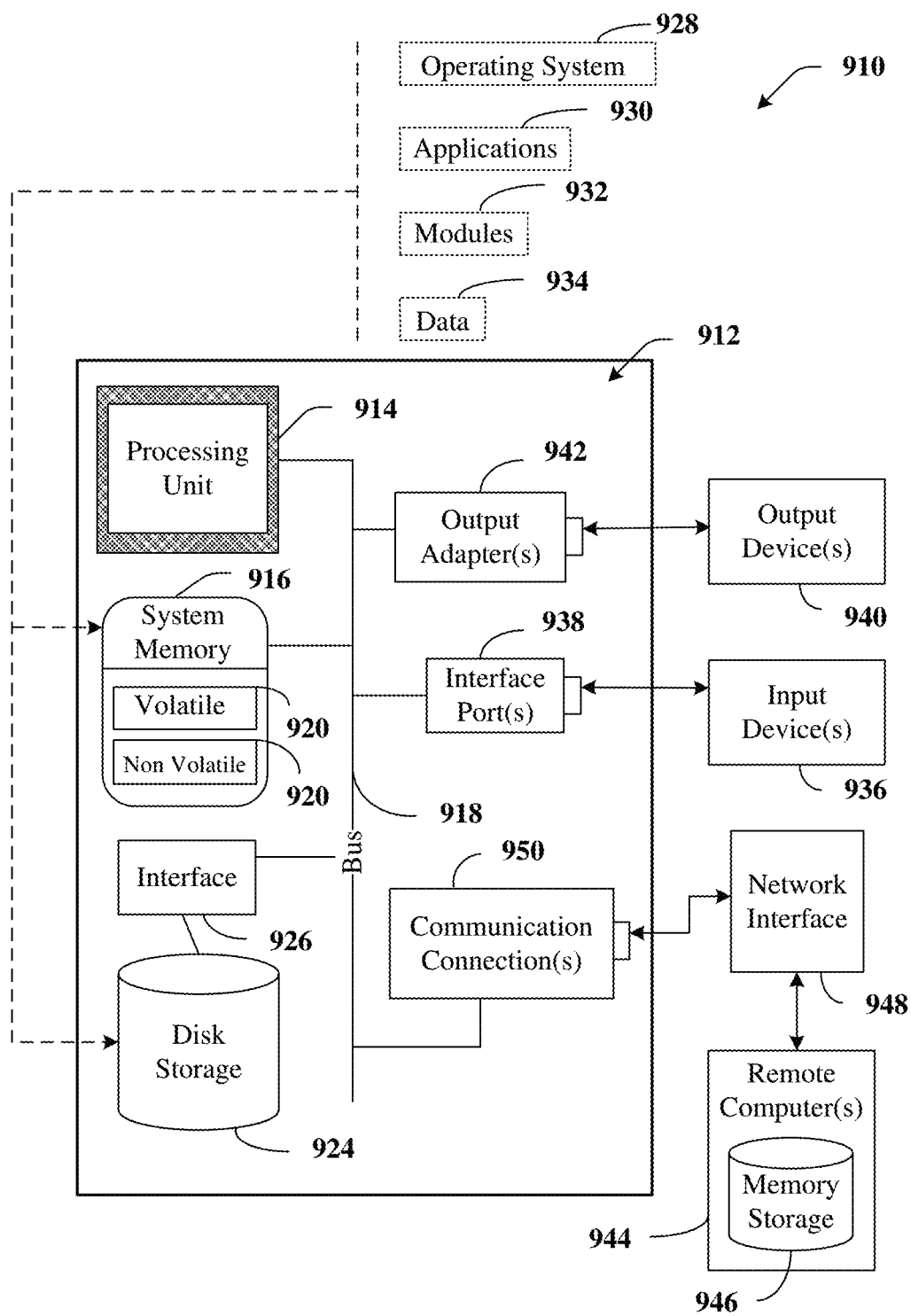
FIG. 9 illustrates an example, non-limiting, computing environment in which one or more embodiments described herein can be facilitated.

In order to provide a context for the various aspects of the disclosed subject matter, FIG. 9 as well as the following discussion are intended to provide a brief, general description of a suitable environment in which the various aspects of the disclosed subject matter can be implemented.

With reference to FIG. 9, an example environment 910 for implementing various aspects of the aforementioned subject matter comprises a computer 912. The computer 912 comprises a processing unit 914, a system memory 916, and a system bus 918. The system bus 918 couples system components including, but not limited to, the system memory 916 to the processing unit 914. The processing unit 914 can be any of various available processors. Multi-core microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 comprises volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can comprise read only memory (ROM), programmable ROM (PROM), electrically programmable ROM (EPROM), electrically erasable PROM (EEPROM), or flash memory. Volatile memory 920 comprises random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also comprises removable/non-removable, volatile/nonvolatile computer storage media. FIG. 9 illustrates, for example a disk storage 924. Disk storage 924 comprises, but is not limited to, devices like a magnetic disk drive, floppy disk drive, tape drive, Jaz drive, Zip drive, LS-100 drive, flash memory card, or memory stick. In addition, disk storage 924 can comprise storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 924 to the system bus 918, a removable or non-removable interface is typically used such as interface 926.

It is to be appreciated that FIG. 9 describes software that acts as an intermediary between users and the basic computer resources described in suitable operating environment 910. Such software comprises an operating system 928. Operating system 928, which can be stored on disk storage 924, acts to control and allocate resources of the computer 912. System applications 930 take advantage of the management of resources by operating system 928 through program modules 932 and program data 934 stored either in system memory 916 or on disk storage 924. It is to be appreciated that one or more embodiments of the subject disclosure can be implemented with various operating systems or combinations of operating systems.

A user enters commands or information into the computer 912 through input device(s) 936. Input devices 936 comprise, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 comprise, for example, a serial port, a parallel port, a game port, and a universal serial bus (USB). Output device(s) 940 use some of the same type of ports as input device(s) 936. Thus, for example, a USB port can be used to provide input to computer 912, and to output information from computer 912 to an output device 940. Output adapters 942 are provided to illustrate that there are some output devices 940 like monitors, speakers, and printers, among other output devices 940, which require special adapters. The output adapters 942 comprise, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically comprises many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies comprise Fiber Distributed Data Interface (FDDI), Copper Distributed Data Interface (CDDI), Ethernet/IEEE 802.3, Token Ring/IEEE 802.5 and the like. WAN technologies comprise, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the system bus 918. While communication connection 950 is shown for illustrative clarity inside computer 912, it can also be external to computer 912. The hardware/software necessary for connection to the network interface 948 comprises, for exemplary purposes only, internal and external technologies such as, modems including regular telephone grade modems, cable modems and DSL modems, ISDN adapters, and Ethernet cards.

Figure 10:
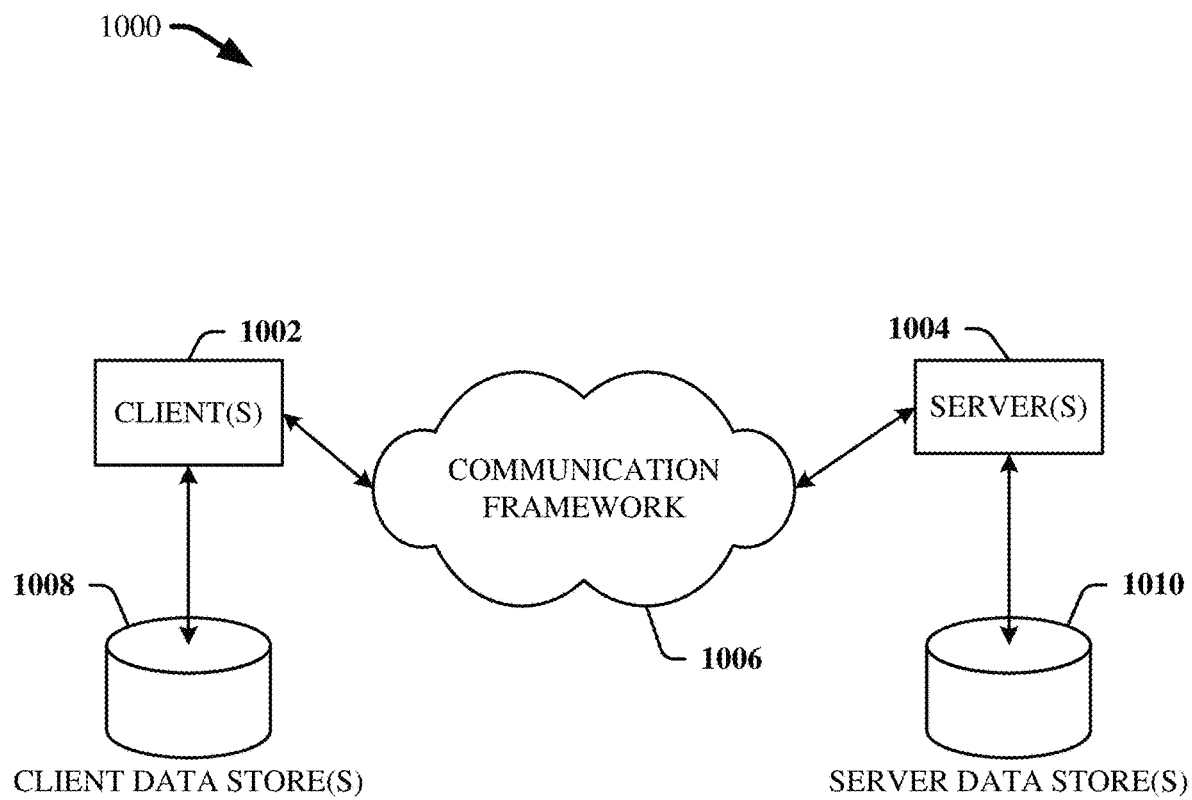
FIG. 10 illustrates an example, non-limiting, networking environment in which one or more embodiments described herein can be facilitated.

FIG. 10 is a schematic block diagram of a sample computing environment 1000 with which the disclosed subject matter can interact. The sample computing environment 1000 includes one or more client(s) 1002. The client(s) 1002 can be hardware and/or software (e.g., threads, processes, computing devices). The sample computing environment 1000 also includes one or more server(s) 1004. The server(s) 1004 can also be hardware and/or software (e.g., threads, processes, computing devices). The servers 1004 can house threads to perform transformations by employing one or more embodiments as described herein, for example. One possible communication between a client 1002 and servers 1004 can be in the form of a data packet adapted to be transmitted between two or more computer processes. The sample computing environment 1000 includes a communication framework 1006 that can be employed to facilitate communications between the client(s) 1002 and the server(s) 1004. The client(s) 1002 are operably connected to one or more client data store(s) 1008 that can be employed to store information local to the client(s) 1002. Similarly, the server(s) 1004 are operably connected to one or more server data store(s) 1010 that can be employed to store information local to the servers 1004.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," "manager," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable storage media can comprise, but are not limited to, random access memory (RAM), read only memory (ROM), electrically erasable programmable read only memory (EEPROM), flash memory or other memory technology, solid state drive (SSD) or other solid-state storage technology, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

Disclosed embodiments and/or aspects should neither be presumed to be exclusive of other disclosed embodiments and/or aspects, nor should a device and/or structure be presumed to be exclusive to its depicted element in an example embodiment or embodiments of this disclosure, unless where clear from context to the contrary. The scope of the disclosure is generally intended to encompass modifications of depicted embodiments with additions from other depicted embodiments, where suitable, interoperability among or between depicted embodiments, where suitable, as well as addition of a component(s) from one embodiment(s) within another or subtraction of a component(s) from any depicted embodiment, where suitable, aggregation of elements (or embodiments) into a single device achieving aggregate functionality, where suitable, or distribution of functionality of a single device into multiple device, where suitable. In addition, incorporation, combination or modification of devices or elements (e.g., components) depicted herein or modified as stated above with devices, structures, or subsets thereof not explicitly depicted herein but known in the art or made evident to one with ordinary skill in the art through the context disclosed herein are also considered within the scope of the present disclosure.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A storage array device, comprising:
   a processor; and
   a memory that stores executable instructions that, when executed by the processor, facilitate performance of operations, comprising:
      receiving, on a first network, a group of data from one or more customer edge devices registered with the storage array device;
      based on validation of the group of data comprising performing edge analytics, generating a first level analytics report;
      based on the first level analytics report, determining a subgroup of the group of data to be used by a secure remote service to generate a second level analytics report based on a core analytics analysis of the subgroup of the group of data; and
      transmitting, on a second network, the subgroup of the group of data to the secure remote service, wherein the storage array device is registered with the secure remote service, and the one or more customer edge devices are not registered with the secure remote service.

2. The system of claim 1, wherein the operations further comprise:
   transmitting, on the first network, a request for the group of data to the one or more customer edge devices.

3. The system of claim 2, wherein functionalities of the one or more customer edge devices are accessible via an application programming interface, and wherein the application programming interface comprises functions of: request for report to obtain requested name information of the one or more customer edge devices, request for logs to obtain requested log information of the one or more customer edge devices, request for license to obtain license information of the one or more customer edge devices, or request for version to obtain version information of the one or more customer edge devices.

4. The system of claim 3, wherein the validation of the group of data comprises validating whether the license information or the version information of the one or more customer edge devices are up-to-date.

5. The system of claim 4, wherein the core analytics analysis on the subgroup of the group of data comprises at least one of analyzing usage information, determining whether the license information is up-to-date, determining whether the version information is up-to-date, or analyzing the log information of the one or more customer edge devices.

6. The system of claim 5, wherein the operations further comprise:
notifying that the license information is outdated license information and is to be updated or the version information is outdated version information and is to be updated, wherein the notifying comprises sending the outdated license information or the outdated version information via a unified notification as a single report for a subset of the one or more customer edge devices comprising the outdated license information or the outdated version information.

7. The system of claim 6, wherein the operations further comprise:
rendering the unified notification using a display associated with the subset of the one or more customer edge devices.

8. A method, comprising:
receiving, by a storage array device comprising a processor, via a first network, a group of data from a group of user edge devices registered with the storage array device;
based on validation of the group of data comprising performing edge analytics, generating, by the storage array device, a first level analytics report;
based on the first level analytics report, determining, by the storage array device, a subgroup of the group of data to be used by a secure remote service to generate a second level analytics report based on a core analytics analysis of the subgroup of the group of data; and
transmitting, by the storage array device, via a second network, subgroup of the group of data to the secure remote service, wherein the storage array device is registered with the secure remote service, and the group of user edge devices are not registered with the secure remote service.

9. The method of claim 8, further comprising:
transmitting, by the storage array device, via the first network, a request for the group of data to the group of user edge devices.

10. The method of claim 9, wherein functionalities of the group of user edge devices are accessible via an application programming interface, and wherein the application programming interface comprises functions of: request for report to obtain requested name information of the group of user edge devices, request for logs to obtain requested log information of the group of user edge devices, request for license to obtain license information of the group of user edge devices, or request for version to obtain version information of the group of user edge devices.

11. The method of claim 10, wherein the validation of the group of data comprises validating, by the storage array device, whether the license information or the version information of the group of user edge devices are up-to-date.

12. The method of claim 11, wherein the core analytics analysis on the subgroup of the group of data comprises at least one of analyzing, based on a result received from the secure remote service or determined by the storage array device:
usage information relative to a defined usage, whether the license information is up-to-date, whether the version information is up-to-date, or the log information of the group of user edge devices.

13. The method of claim 12, further comprising:
notifying, by the storage array device, that the license information is outdated license information and is to be updated or the version information is outdated version information and is to be updated, wherein the notifying comprises sending the outdated license information or the outdated version information via a unified notification as a single report for the group of user edge devices comprising the outdated license information or the outdated version information.

14. The method of claim 13, further comprising:
rendering, by the storage array device, the unified notification using a display.

15. A non-transitory machine-readable medium, comprising executable instructions that, when executed by a processor of a storage array device, facilitate performance of operations, comprising:
receiving, via a first network, a group of data from an edge device;
based on validation of the group of data comprising performing edge analytics, generating a first level analytics report;
based on the first level analytics report, determining subgroup of the group of data to be used by a secure remote service to generate a second level analytics report based on a core analytics analysis of the subgroup of the group of data; and
transmitting, via a second network, the subgroup of the group of data to the secure remote service, wherein the storage array device is registered with the secure remote service, and the edge device is not registered with the secure remote service.

16. The non-transitory machine-readable medium of claim 15, wherein the operations further comprise:
transmitting, via the first network, a request for the group of data to the edge device.

17. The non-transitory machine-readable medium of claim 16, wherein functionalities of the edge device are accessible via an application programming interface, and wherein the application programming interface comprises functions of: request for report to obtain requested name information of the edge device, request for logs to obtain requested log information of the edge device, request for license to obtain license information of the edge device, or request for version to obtain version information of the edge device.

18. The non-transitory machine-readable medium of claim 17, wherein the validation of the group of data comprises validating whether the license information or the version information of the edge device are up-to-date.

19. The non-transitory machine-readable medium of claim 18, wherein the core analytics analysis on the subgroup of the group of data comprises at least one of analyzing usage information, determining whether the license information is up-to-date, determining whether the version information is up-to-date, or analyzing the log information of the edge device.

20. The non-transitory machine-readable medium of claim 19, wherein the operations further comprise:

notifying that at least one of the license information is outdated license information and is to be updated or the version information is outdated version information and is to be updated, wherein the notifying comprises sending the outdated license information or the outdated version information via a unified notification as a single report for the edge device.

* * * * *